INVENTORS
Joachim GROTH
Heinrich ZEIMET

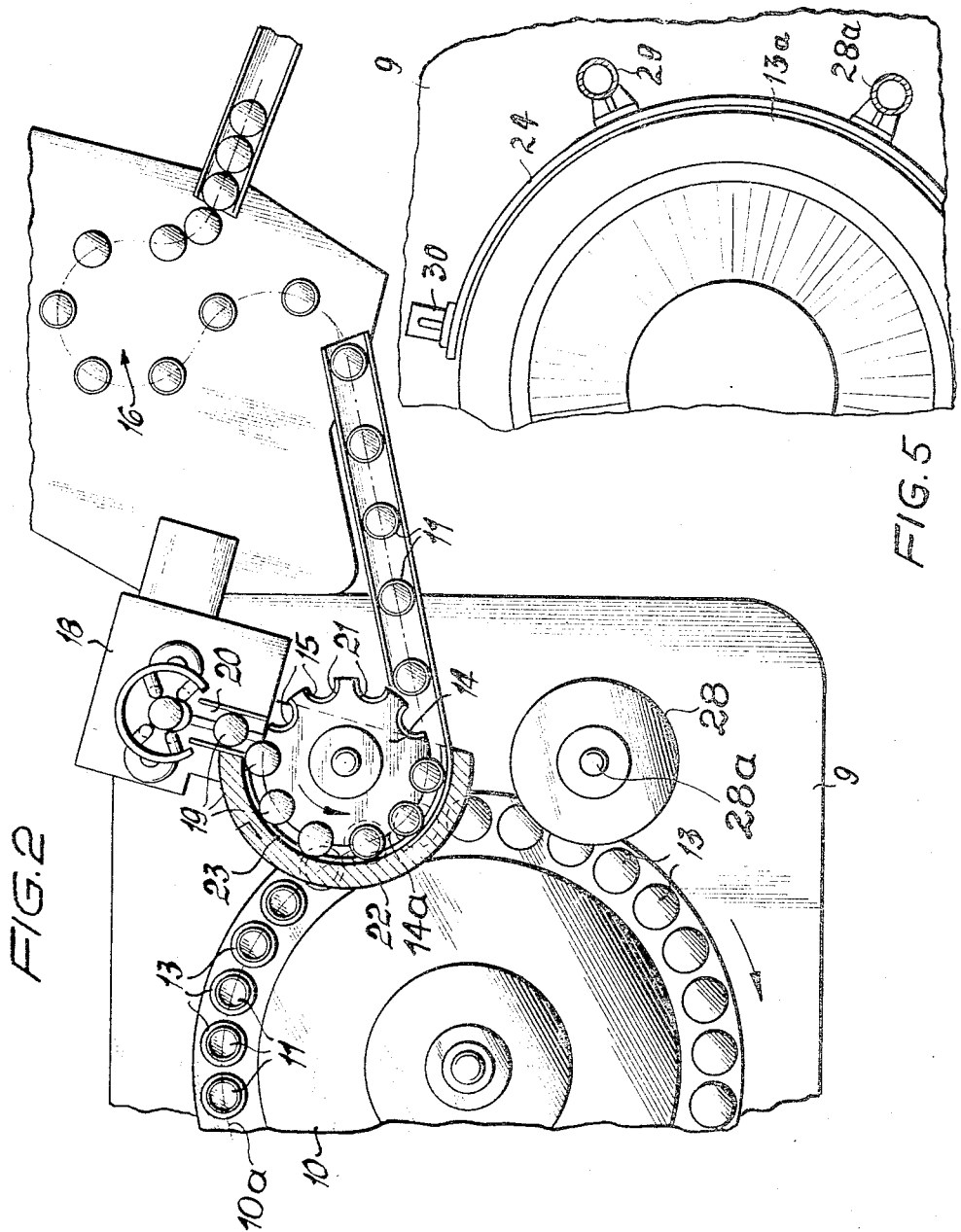

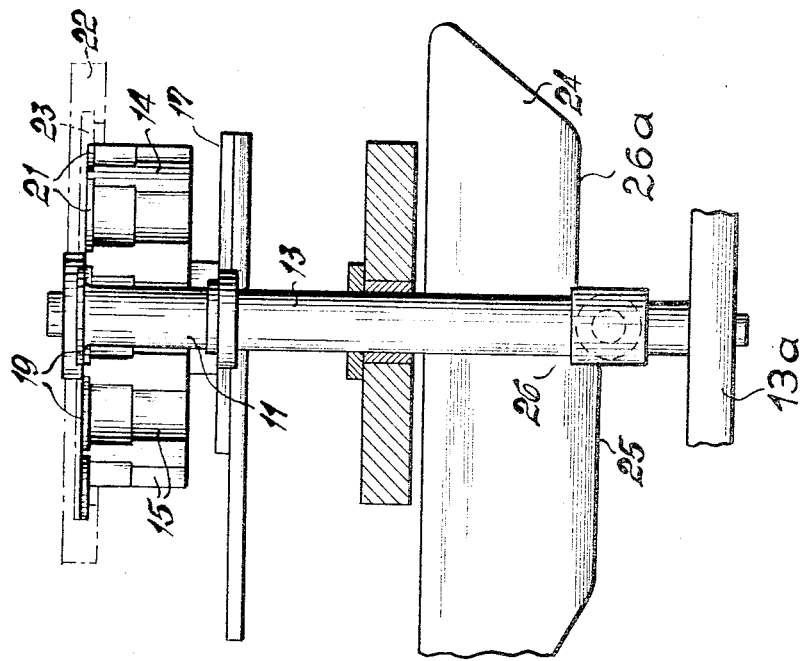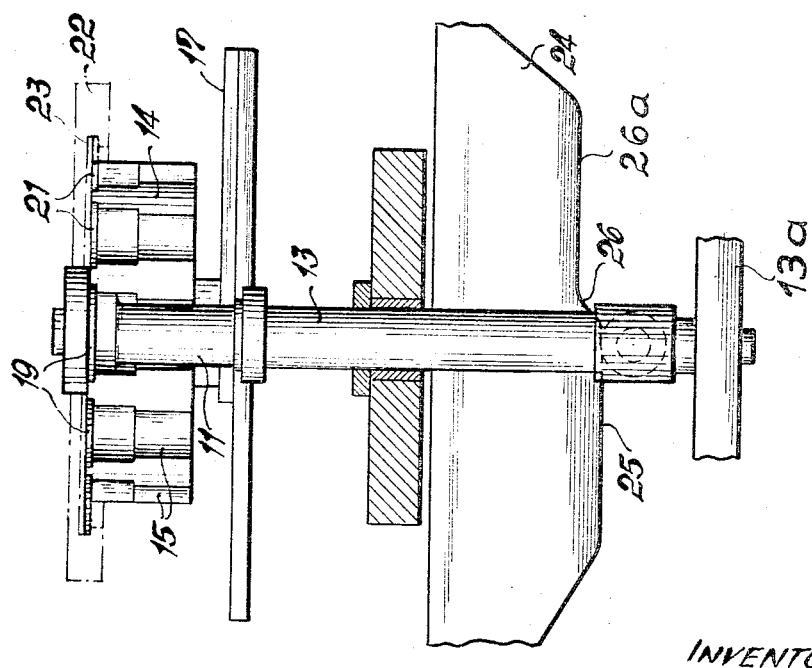

United States Patent Office 3,364,652
Patented Jan. 23, 1968

3,364,652
APPARATUS FOR PLACING THE CLOSURE LID ON FILLED CANS
Joachim Groth, Bad Munster am Stein, and Heinrich Zeimet, Bingen-Budesheim, Germany, assignors to Seitz-Werke G.m.b.H., Bad Kreuznach, Germany
Filed June 7, 1965, Ser. No. 461,729
Claims priority, application Germany, June 5, 1964, S 91,404
5 Claims. (Cl. 53—282)

The present invention relates to the placing of the closure lid on filled cans in filling machines. When filling beverages into cans in a filling machine and subsequently closing the cans by means of an associated closing apparatus, it is a drawback that during the transporting of the vessels from the point where they leave the filling machine to the point where the closing lid is placed on the can in the closing device, the can is open and the contents exposed to air for a relatively long time. With cans filled close to the rim, there exists the additional danger that the liquid in the can during the said transport thereof splashes over so that the can contents is affected. Furthermore, with beverages such as beer, which contain carbonic acid, the exposure of such beverages to air and the movement of the surface of the beverages harmfully affects the contents of carbonic acid.

It is, therefore, an object of the present invention to provide an arrangement for placing the closing lid on liquid filled vessels, for instance cans, which will overcome the above-mentioned drawbacks.

It is another object of this invention to provide an arrangement as set forth in the preceding paragraph according to which the placement of the lid on the vessel will be effected directly after the filling operation has been completed.

It is still another object of this invention to provide an arrangement as set forth above, according to which the lid is placed on the filled container within the range of the filling machine so that the filled container will move to the closing machine with the contents being covered by the lid.

These and other objects and advantages of the invention will appear more clearly from the following specification in connection with the accompanying drawings, in which:

FIGURE 2 shows a top view of the filling machine according to FIGURE 1 but with the closing apparatus;

FIGURE 3 illustrates partly in section and partly in view the release turnstile of the filling machine in a position prior to the can receiving the lid therefor;

FIGURE 4 is a showing similar to that of FIGURE 3 but at a time when the can receives its lid.

FIGURE 5 is a section taken along the line V—V of FIG. 1.

The present invention is characterized primarily in that the lids for the vessels to be closed are supplied by a stacking or similar device to the release turnstile for the cans which releases and discharges the filled vessels from the filling machine. The lids are placed on said turnstile individually within the range of its guiding recesses. The invention is furthermore characterized in that the vessels, after having been filled, are by means of lifting cylinders lowered below the plane of the transporting means and at the contact points of the pitch circle of said turnstile with the pitch circle of the lifting cylinder are returned into the transporting plane while the vessels receive the lids from the said turnstile. For this upward movement of the vessels, the lids are conveyed to the turnstile either before or at the time of contact of its pitch circle with the pitch circle of the lifting cylinder piston arrangement.

The filling machine for carrying out the above-mentioned method is, according to the present invention, provided with a release or discharge turnstile which, in the plane of the upper limits of its guiding recesses, has semi-circular supporting surfaces designed in conformity with the lids. These supporting surfaces provided for receiving the lids, are in conformity with the present invention, within the range of the circulatory path of said turnstile covered at the top by a plate, said range extending from the inlet for the lids to the discharge of the vessels to the transporting means. Advantageously, the said plate is provided with slot guiding means designed in conformity with the diameter of the lids. This guiding means guides the lids laterally and along their bottom surface.

Figure 1:
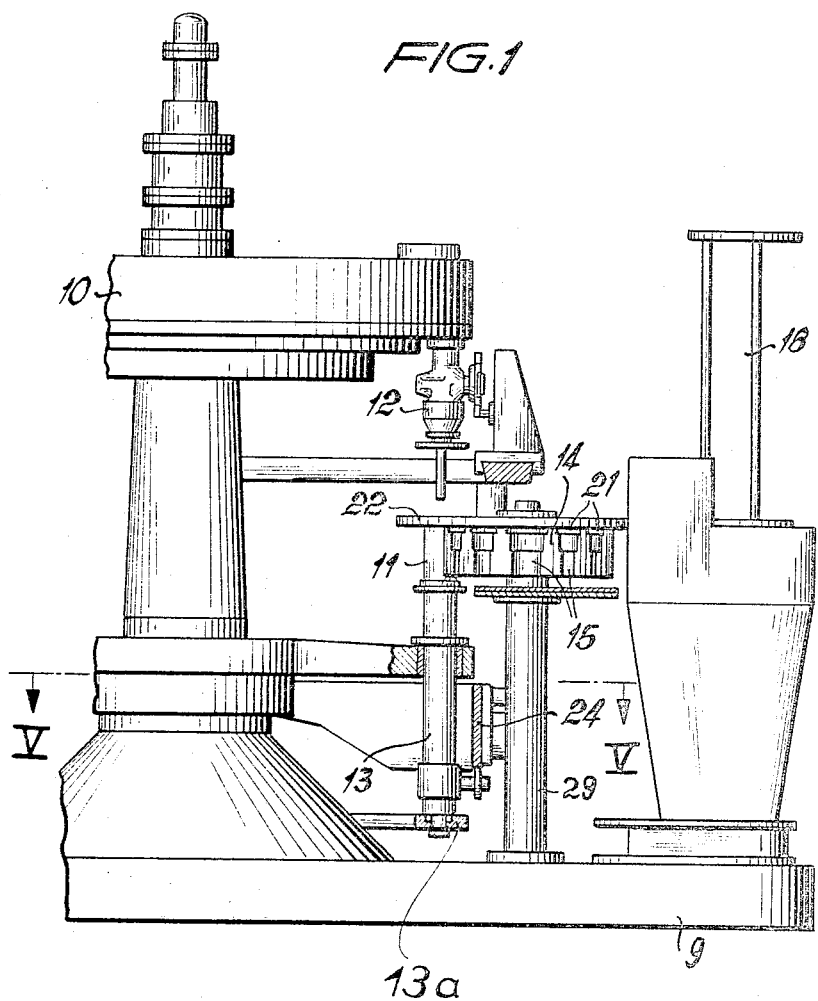
FIGURE 1 is a front view of a filling machine with a lid stacking device but without the closing apparatus.
Figure 6:
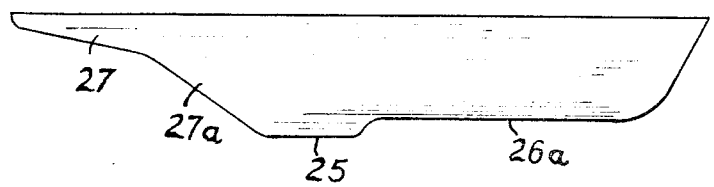
FIGURE 6 shows the development of a cam for use in connection with the present invention.

Referring now to the drawings in detail, the filling machine 10 illustrated in FIGS. 1 and 2, which may be of any standard design, as for instance disclosed in German Patent No. 1,155,052, is provided with a number of pneumatically operable, circulatory lifting cylinders or units 13 for pressing the cans 11 to be filled against filling elements 12 of filling machine 10. Compressed air is fed to units 13 via an annular passage 13a.

Filling machine 10 furthermore comprises a loading turnstile 28 supported by a post 28a and also comprises a release or discharge turnstile 14 the pitch circle of which contacts the pitch circle 10a of cylinders or units 13 at the filler discharge opening. Turnstile 14 has a plurality of guiding recesses 15 having a contour in conformity with the contour of cans 11. A conveyor 17 leads from turnstile 14 to a lid closing apparatus 16 of any standard design. Within the range of turnstile 14 there is furthermore provided a stacking device 18 for the lids 19 to be used for closing the cans. Guiding means 20 lead from stacking device 18 into the circulatory path of discharge turnstile 14.

The guiding recesses 15 in turnstile 14 are, within the plane of their upper extension provided with semi-circular surfaces 21 which are designed in conformity with the diameter of lids 19 and serve as support for said lids. The arrangement shown in the drawing furthermore comprises a plate 22 which forms a top cover for the supporting surfaces 21 and extends over a range of the circulatory path of turnstile 14, which range extends from the lid supply or guiding means 20 to the discharge point of cans 11 onto the transporting means 17. Plate 22 has a guiding slot 23 (FIGS. 3 and 4) designed in conformity with the diameter of lids 19. The wall portions confining slot 23 support those portions of the lids 19 which are not carried by the supporting surfaces 21 of turnstile 14.

Filling machine 10 has associated therewith a cam 24 (FIGS. 3, 4 and 5) extending over a portion of the circumference of filling machine 10 only, namely over the range of the discharge portion and the filling portion of the machine (FIG. 5). Cam 24 is connected to post 28a and post 29 of turnstile 14 and is furthermore supported by a bracket 30 connected to bottom plate 9 of the machine. Cam 24 is provided with a cam section 25 and a cam section 26a merging with cam section 25 along the cam section 26. Cam section 25 causes cylinders or units 13, following the completion of the filling operation, to move below the plane of conveyor 17, whereas cam section 26a permits the cylinders or units 13 to return into the plane of conveyor 17. Cam section 25 merges with cam section 26a along section 26 within the range of contact of the pitch circle 14a of turnstile 14 with the pitch circle 10a of cylinders or units 13.

When in customary manner a conveyor (not illustrated) feeds cans 11 through loading turnstile 28 into filling machine 10 and when the said cans are placed upon the lifting cylinders or units 13, said units press cans 11 against the filling elements 12. During a further rotation of the units 13, the cans 11 are filled and subsequently are, by means of the downwardly moving cylinders or units 13, in conformity with cam section 27, 27a of cam 24 withdrawn from the filling elements 12 and move into the range of the discharge turnstile 14.

During the filling operation, discharge turnstile 14 which rotates in a direction opposite to the direction of rotation of the filling elements 12 and cylinders or units 13, continuously receives lids 19 from the stacking device 18 through guiding means 20. These lids 19 are individually placed upon surfaces 21. Lids 19 are by means of the guiding slot 23 of plate 22 prevented from moving out of turnstile recesses 15 until they reach conveyor 17. Until the lids 19 reach the contact point of the pitch circle 14a of turnstile 14 with the pitch circle 10 of the respective lifting cylinders or units 13, they rest on the surfaces 21. At the contact point of these two pitch circles, a transfer of the respective lid is effected from said turnstile to the opening of the respective can. This is effected in such a way that the respective can 11 which in view of cam section 25 with cylinder piston unit 13 has been lowered below the plane of conveyor 17, will in view of the cam section 26a carry out an upward movement into the plane of conveyor 17. The said can lifts the respective lid 19 resting on a surface 21 of turnstile 14 and thus takes this lid over. The can 11 thus covered by lid 19 is subsequently by discharge turnstile 14 conveyed to conveying means 17 which feeds the thus covered can to the closing apparatus 16.

It is, of course, to be understood that the present invention is, by no means, limited to the particular arrangement shown in the drawings, but also comprises any modifications within the scope of the appended claims.

What we claim is:

1. In a vessel filling machine having filling means arranged along a first circle for filling vessels, a plurality of lifting means movable along a second circle below said filling means and adapted to be lifted and lowered relative thereto, said lifting means being operable to receive and support vessels to be filled and to press the same against said filling means, a turnstile having a plurality of marginal approximately semicircular cutouts arranged so that approximately the center of curvature of said cutouts is located along a third circle, said second and third circles being so located with regard to each other as to have a common vertical tangential plane while their center points are located on opposite sides of said common vertical tangential plane, each of said cutouts including a marginal area for receiving and supporting a closure member for closing a vessel filled by said filling machine, means for continuously feeding closure members onto said marginal supporting areas of said turnstile, and control means operatively connected to said lifting means and operable to control the latter to move a vessel supported thereby into said turnstile with the upper marginal rim of said vessel below and subsequently above the respective adjacent marginal supporting area to thereby cause the respective vessel to lift a closure member off the respective adjacent marginal area.

2. In a vessel filling machine having filling means arranged along a first circle for filling vessels, a plurality of lifting means movable along a second circle below said filling means and adapted to be lifted and lowered relative thereto, said lifting means being operable to receive and support vessels to be filled and to press the same against said filling means, a turnstile having a plurality of marginal approximately semicircular cutouts arranged so that approximately the center of curvature of said cutouts is located along a third circle, said second and third circles being so located with regard to each other as to have a common vertical tangential plane while their center points are located on opposite sides of said common vertical tangential plane, each of said cutouts including a marginal area for receiving and supporting a closure member for closing a vessel filled by said filling machine, means for continuously feeding closure members onto said marginal supporting areas of said turnstile, control means operatively connected to said lifting means and operable to control the latter to move a vessel supported thereby into said turnstile with the upper marginal rim of said vessel below and subsequently above the respective adjacent marginal supporting area to thereby cause the respective vessel to lift a closure member off the respective adjacent marginal area, cover means arranged above said marginal areas of said turnstile in slightly vertically spaced relationship thereto, and conveyor means arranged adjacent said turnstile for receiving therefrom filled vessels with a closure member thereon.

3. A filling machine according to claim 2, in which said cover means extends from a point where said closure means enter said turnstile to a point near the entrance to said conveyor means.

4. A filling machine according to claim 2, in which said cover means has slotted guiding means for guiding closure means fed onto the marginal area on said turnstile.

5. In a vessel filling machine having filling means arranged along a first circle for filling vessels, a plurality of lifting means movable along a second circle below said filling means and adapted to be lifted and lowered relative thereto, said lifting means being operable to receive and support vessels to be filled and to press the same against said filling means, a turnstile having a plurality of marginal approximately semicircular cutouts arranged so that approximately the center of curvature of said cutouts is located along a third circle, said second and third circles being so located with regard to each other as to have a common vertical tangential plane while their center points are located on opposite sides of said common vertical tangential plane, each of said cutouts including a marginal area for receiving and supporting a closure member for closing a vessel filled by said filling machine, means for continuously feeding closure members onto said marginal supporting areas of said turnstile, and cam means for operative engagement with said lifting means to control the upward and downward movement thereof, said cam means having a first section for lifting a vessel on the respective lifting means thereabove against said filling means and also having a second section for lowering said lifting means within the range where said second and third circles engage said common vertical tangential plane so that a vessel supported by said lifting means will have its upper marginal rim below said marginal area, said cam means also having a third section for slightly lifting the respective lifting means so as to cause a vessel supported by said respective lifting means to lift the upper marginal portion thereof above the level of the respective marginal area.

References Cited

UNITED STATES PATENTS 2,693,305 11/1954 Boyd et al. _____ 53—37 X
3,286,436 11/1966 Lakso _____ 53—281

TRAVIS S. McGEHEE, *Primary Examiner.*

ROBERT L. FARRIS, *Assistant Examiner.*